United States Patent [19]

Hoshikawa et al.

[11] 4,377,404
[45] Mar. 22, 1983

[54] HERMETIC GLASS-TO-METAL SEAL AND METHOD FOR MAKING SAME

[75] Inventors: Takeshi Hoshikawa, Neyagawa; Iwao Takinami, Toyonaka, both of Japan

[73] Assignees: Matsuo Electric Company Limited; Osaka City, both of Osaka, Japan

[21] Appl. No.: 282,144

[22] Filed: Jul. 10, 1981

[30] Foreign Application Priority Data

Jul. 19, 1980 [JP] Japan .................................. 55-98924
Jul. 19, 1980 [JP] Japan .................................. 55-98925

[51] Int. Cl.$^3$ .......................................... C03C 29/00
[52] U.S. Cl. .................................. 65/59.22; 65/59.24; 65/59.25; 65/59.31; 65/59.35; 174/137 B; 501/66

[58] Field of Search .................. 65/59.22, 59.24, 59.25, 65/59.27, 59.31, 59.34, 59.35; 501/66; 174/137 B

[56] References Cited

U.S. PATENT DOCUMENTS

| | | | |
|---|---|---|---|
| 732,812 | 7/1903 | Anderson | 65/59.35 X |
| 2,697,309 | 12/1954 | Gates | 65/59.27 |
| 3,545,950 | 12/1970 | Earl | 65/59.35 |
| 3,669,698 | 6/1972 | Graff et al. | 501/66 X |

Primary Examiner—Robert L. Lindsay, Jr.
Attorney, Agent, or Firm—Wenderoth, Lind & Ponack

[57] ABSTRACT

This invention relates to a manufacturing method and a hermetic glass-to-metal seal suitable for a component in an electric circuit such as a liquid tantalum electrolytic capacitor. The method comprises the steps of fusing a raw material glass in order to form a glass tube; setting a bead, obtained by cutting the glass tube across the axis, in the opening to be sealed, for example, the opening of a member which forms a circuit component; and heating the assembly of the members which composes the circuit component including the bead, above the melting temperature of the bead, with a longitudinal conductor piercing through the bead. This simplified method of manufacturing a hermetic glass-to-metal seal accomplishes a perfect sealing since the sealing glass includes no undesirable impurities such as binder, and since the thermal expansion coefficient of the sealing glass is close to that of the metals used to construct the circuit components, and the sealing glass is stable to electrolyte.

4 Claims, 3 Drawing Figures

HERMETIC GLASS-TO-METAL SEAL AND METHOD FOR MAKING SAME

BACKGROUND OF THE INVENTION

1. Field of the Invention

The present invention relates to a manufacturing method and a hermetic glass-to-metal seal for a circuit component such as liquid electrolytic capacitor.

2. Description of the Prior Art

A conventional insulated sealing material for a liquid electrolytic capacitor employs a gasket made of rubber or synthetic resin. This gasket does not provide gas tight performance, although it accomplishes the sealing effect when squeezed by the cathode case. Therefore, there is a possibility that the electrolyte will leak, causing a reduction in the capacitance of the capacitor, and there is also the possibility the escaped electrolyte will corrode the parts around the capacitor.

For a dry-type electrolytic capacitor, hermetic glass-to-metal seal is employed. For example, in U.S. Pat. No. 3,669,698, binder is added to the raw material glass powder. A bead is prepared by the calcination of the above-mentioned mixture after it is mixed homogeneously, pressed to a certain form and then dried to volatilize the solvent in the binder.

The bead, mentioned above, is set into an opening of a member which composes the capacitor, and fused with a longitudinal conductor so arranged that it pierces through the bead. In this prior art, suspended dust in the air is apt to contaminate the bead since the prior art method involves a lot of steps. Moreover, there is a possibility that the added binder for forming a bead does not volatilize entirely during the calcination and remains in the glass. The binder remaining in the glass may cause a phase separation of the glass and the melting glass is not apt to flow. Therefore there is a possibility that the contact condition between the glass and the metallic member or longitudinal conductor becomes imperfect so that the glass cracks.

It is an object of the invention to provide a manufacturing method and a hermetic glass-to-metal seal which employs glass including no undesirable impurities so as to accomplish a perfect sealing.

It is another object of the invention to provide a manufacturing method for a hermetic glass-to-metal seal which is very simple.

For a better understanding of the present invention, together with other objects, reference is made to the following description, taken in conjunction with the accompanying drawings.

SUMMARY OF THE INVENTION

To accomplish the foregoing objectives, there is provided a manufacturing method of forming a hermetic glass-to-metal seal comprising the steps of (a) focusing the raw material glass in order to form a glass tube, (b) setting a bead, obtained by cutting the glass tube across its axis, in the opening of a member used in constructing a circuit component, and (c) heating the bead above its melting temperature for fusing, with a longitudinal conductor piercing through the bead.

There is also provided sealing glass having the following composition: (1) 67–71% of silicon dioxide $SiO_2$, (2) 3–5% of aluminum oxide $Al_2O_3$, (3) 12–14% of boric anhydride $B_2O_3$, (4) 8–10% of sodium oxide $Na_2O$ or a mixture wherein under two thirds of the sodium oxide is replaced by potassium oxide $K_2O$, (5) 3–6% of barium oxide $BaO$, or calcium oxide $CaO$, or a mixture of both and (6) under 2% of lithium oxide $Li_2O$.

The manufacturing method of forming the hermetic glass-to-metal seal is simplified and it accomplishes a perfect sealing because the sealing glass includes no undesirable impurities such as binder. Moreover, as the thermal expansion coefficient of the sealing glass is close to that of the metals for the circuit components, and the sealing glass is stable to electrolytes, a perfect sealing effect is accomplished.

BRIEF DESCRIPTION OF THE DRAWINGS

A detailed description of the invention will be made with reference to the accompanying drawings, which are to scale. Like numerals designate corresponding parts in the several figures.

DETAILED DESCRIPTION OF THE INVENTION

The following detailed description is of the best presently contemplated mode of carrying out the invention. This description is not to be taken in a limited sense, but is made merely for the purpose of illustrating the general principles of the invention since the scope of the invention is best defined by the appended claims.

Figure 1:
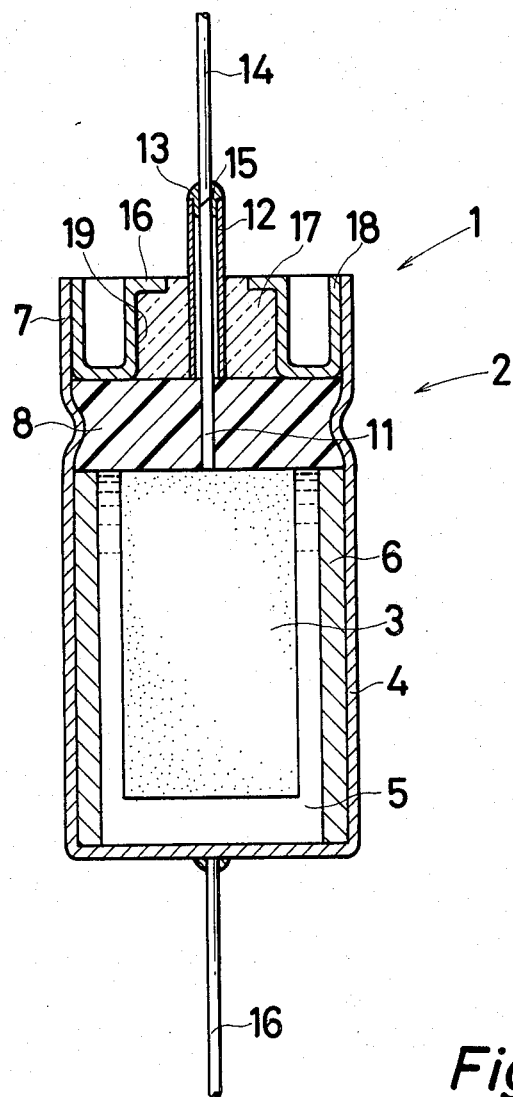
FIG. 1 is a vertical section of a liquid tantalum electrolytic capacitor sealed with the hermetic glass-to-metal seal of this invention.

FIG. 1 is a vertical section of a liquid electrolytic capacitor 2 sealed with the glass-to-metal seal 1 of this invention. A cylindrical anode 3 is put in a canister-shaped cathode case 4. The anode 3 consists of a sintered tantalum or foiled tantalum having an oxidized layer on the surface. The cathode case 4 consists of tantalum or niobium which is stable to an electrolyte. A liquid or gel-type electrolyte, for example, sulfuric acid and/or phosphoric acid, is filled in space 5 between the cathode case 4 and the anode 3. A layer 6 of sintered tantalum powder is coated on the inside surface of the cathode case 4 which contacts the electrolyte. A gasket 8 made of fluoro-resin is strangled and fixed tightly to the cathode case 4. The anode 3 is fixed to the gasket 8 on the same axis. The upper site 7 of the cathode case 4 is sealed with the glass-to-metal seal 1 according to the invention.

An end of the tantalum wire 11 is connected with the anode 3. The tantalum wire 11 is inserted in the tantalum tube conductor 12 fixed to glass-to-metal seal 1 which will be mentioned hereinbelow. The upper portion 13 of the conductor 12 is connected with the other end of the tantalum wire 11 and lead wire 14 rigidly, hermetically and electrically. Element 15 is a brazing material. Element 10 is a negative lead wire.

Figure 2:
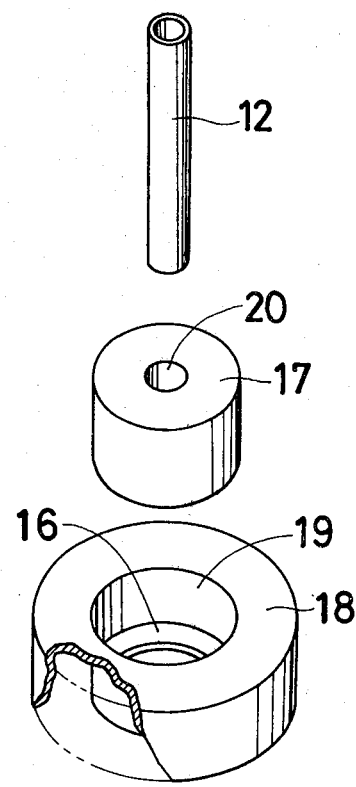
FIG. 2 is an exploded perspective view of the hermetic glass-to-metal seal configuration.

FIG. 2 is an exploded perspective view of the glass-to-metal seal 1. A bead 17 made of the glass having the formation mentioned hereinafter, is fixed to the opening 19 of the ring member 18 made of tantalum, and is supported by the inward flange 16. The ring member 18 in FIG. 2 is shown inversely to that in FIG. 1. The conductor 12 is inserted in and fixed to the bore 20 along the axis of the bead 17. The ring member 18 and the conductor 12 are hermetically fixed by the melting bead 17 by heating. The melting fusion is accomplished by heating at the temperature of about 1100°–1200° C. in vacuo or in an inert gas atmosphere, in which the excess oxidation of tantalum is prohibited. The hermetically sealed ring member 18 is set to the cathode case 4, and hermetically fixed by welding.

Figure 3:
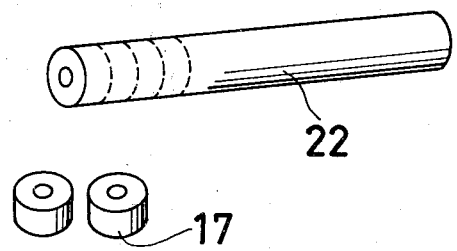
FIG. 3 is a perspective view for illustrating a manufacturing process for the bead.

For manufacturing the bead 17, a mixture of the powdered glass raw material, which is mixed in predetermined proportions, is melted at about 1400°–1500° C. in a fused alumina crucible. The melted glass is poured on an iron plate or poured into water to chill quickly. The glass obtained by chilling quickly is crushed to fine powder, to obtain a homogeneous glass. This powdered glass is melted again, and is quickly extended to form the glass tube 22, represented in FIG. 3, before the melted glass solidifies hardning. The glass tube 22 is cut at a right angle to the axis line along the broken line shown in FIG. 3 to obtain the bead 17.

According to one aspect of the invention, the press forming step is not employed for manufacturing the bead, thus the invention does not require the binder mentioned in the prior art. Therefore, it is possible to omit the series of steps related to the binder, such as the mixing of the binder, the press molding step, the drying of the solvent used for the binder, and the calcination step. Moreover, suspended dust in the air does not contaminate or attach to the bead because the manufacturing steps are reduced in comparison with the prior art.

Explanation will be given hereinbelow about the desirable glass-formation of the bead 17 molded according to the method of the above-stated examples.

The bead 17 contains (1) 67–71% of silicon dioxide $SiO_2$, (2) 3–5% of aluminum oxide $Al_2O_3$, (3) 12–14% of boric anhydride $B_2O_3$, (4) 8–10% of sodium oxide $Na_2O$, (5) 3–6% of barium oxide BaO, or calcium oxide CaO, or a mixture of both and (6) under 2% of lithium oxide $Li_2O$. The mixture ratio of the glass batch of this composition is chosen to satisfy the following requirements (1)–(3) so as to seal the opening of the member consist of tantalum in a liquid electrolytic capacitor.

(1) The thermal expansion coefficient of the bead made of the glass should be equal or approximately equal to that of the tantalum or niobium.

(2) The wettability of the melting glass should be sufficient to accomplish good contact with the surface of the tantalum or.

(3) The glass should be chemically stable to the acid electrolytes.

Table 1 represents the result of experiments to investigate the chemical and physical characteristics of this glass as described in requirements (1)–(3) in various glass compositions. The amount of alkaline elution in Table 1 which was tested by the testing method specified under Japanese Industrial Standard R 3502, shows the stability against acids; the lower the value is, the stabler the bead 17 is.

TABLE 1

| | Run No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Weight percent of component | | | | | | | | | | | | |
| $SiO_2$ | 68 | 70 | 70 | 70 | 69 | 64 | 70 | 69 | 70 | 70 | 71.5 | 69.5 |
| $B_2O_3$ | 14 | 12 | 12 | 8 | 14 | 17 | 12 | 12 | 12 | 12 | 12 | 12 |
| $Na_2O$ | 8 | 8 | 10 | 12 | 7 | 8 | 4 | 8 | 8 | 8 | 8 | 3 |
| $K_2O$ | 0 | 0 | 0 | 0 | 0 | 0 | 4 | 0 | 0 | 0 | 0 | 6 |
| $Al_2O_3$ | 5 | 5 | 3 | 5 | 5 | 6 | 5 | 4 | 3 | 4 | 3.5 | 4 |
| BaO | 4 | 4 | 4 | 4 | 4 | 4 | 4 | 4 | 3 | 4 | 4 | 4 |
| CaO | 0 | 0 | 0 | 0 | 0 | 0 | 0 | 0 | 3 | 0 | 0 | 0 |
| $Li_2O$ | 1 | 1 | 1 | 1 | 1 | 1 | 1 | 3 | 1 | 2 | 1 | 1.5 |
| $CaF_2$ | 0.4 | 0.4 | 0.4 | 0.4 | 0.4 | 0.4 | 0.4 | 0.2 | 0.4 | 0.4 | 0.4 | 0.4 |
| NiO | 0 | 0 | 0 | 0 | 0 | 0 | 0 | 0 | 0.5 | 0 | 0 | 0 |
| CoO | 0 | 0 | 0 | 0 | 0 | 0 | 0 | 0 | 0 | 0.01 | 0 | 0 |
| Expansion Coefficient ($\times 10^{-7}/°C.$) | 65.2 | 63.3 | 67.0 | 71.9 | 55.9 | 65.9 | 59.3 | 66.3 | 62.2 | 62.9 | 59.2 | 67.2 |
| Amount of Alkaline Elution (mg) | 0.14 | 0.05 | 0.10 | 0.17 | 0.11 | 0.62 | 0.05 | 0.14 | 0.15 | 0.13 | 0.03 | 0.12 |
| Fusing Temperature (°C.) | 1200 | 1250 | 1100 | 1100 | 1200 | 1000 | 1200 | 1150 | 1200 | 1200 | 1250 | 1200 |
| Condition after Fusing | O | O | O | X | X | O | O | partly cracked | O | O | O | O |
| Condition after Treatment with Acid | O | O | O | X | X | X | O | X | O | O | O | O |

X in the Table 1 shows that the bead 17 was cracked after gradual cooling and/or the acid treatment, while O means that the bead 17 was not cracked.

When the content of sodium oxide $Na_2O$ is less than 8%, the thermal expansion coefficient of the glass is lower than $58\times10^{-7}/°C.$, and therefore the difference between this value and the thermal expansion coefficient of tantalum $(63\pm1)\times10^{-7}/°C.$ is more than $6\times10^{-7}/°C.$ The glass is melted as high as 1200° C. to be fixed to tantalum rigidly when they are chilled. In this case in the cooling down step, stress arises between the two materials. As the stress exceeds the intensity of the glass, the bead 17 breaks. Also, when the content of sodium oxide $Na_2O$ is more than 10%, the thermal expansion coefficient of the glass exceeds $69\times10^{-7}/°C.$, and the difference in thermal expansion coefficients between the glass and tantalum exceeds $7\times10^{-7}/°C.$, and as a result, the bead 17 breaks in the cooling step.

When the content of boric anhydride $B_2O_3$ is less than 12%, the amount of silicon dioxide $SiO_2$ and aluminum oxide $Al_2O_3$ in the glass component increases, the thermal expansion coefficient becomes higher, and as a result, the bead 17 breaks in the cooling step. Moreover, when the content of boric anhydride $B_2O_3$ is more than 14%, the amount of alkaline elution increases, and the chemical stability decreases.

In the case where the content of aluminum oxide $Al_2O_3$ is less than 3%, the glass phase is inclined to separate (i.e. liquid-liquid separation of the glass or partial crystallization of the glass) during the gradual cooling down step after fusing. Therefore, the chemical stability of the bead 17 decreases remarkably, and also, the bead has an abnormally large expansion. Also, when the content of aluminum oxide $Al_2O_3$ is more than 5%, the viscosity of the glass at high temperature increases, and as a result, the contact between the bead 17 and the metal is insufficient for fixing in a fusing step.

The addition of lithium oxide $Li_2O$ to the glass serves to lower the viscosity of the glass. Nevertheless, more than 2% of lithium oxide accelerates the phase separation of the glass in the gradual cooling down step.

The addition of barium oxide BaO and/or calcium oxide CaO to the glass lowers the viscosity of the glass at high temperature. However, when the total amount of these two components exceeds 6%, it accelerates the phase separation of the glass.

According to another aspect of the invention calcium fluoride $CaF_2$, cobaltous oxide CoO and nickel monoxide NiO may be added to the above-stated glass components. The addition of 0.2-0.4% of calcium fluoride reduces the formation of bubbles in the glass, and accelerates homogenization of the glass, which prevents phase separation and breakage of the glass. Also, addition of a trace amount of cobaltous oxide CoO or nickel monoxide NiO is able to color the glass, not changing the fundamental characteristics of the glass. Therefore, it could be valuable in appearance for commerce.

Under two-thirds the amount of sodium oxide $Na_2O$ in the raw glass may be replaced by potassium oxide $K_2O$. The replacement enables the glass to keep good contact with the metal, not changing the thermal expansion coefficient or the stability to chemical agents greatly.

The invention may be applicable not only for a liquid electrolytic capacitor but for circuit components such as a resistor and a transistor.

What is claimed is:

1. A method of forming a hermetic glass-to-metal seal in a first opening of a metal member, comprising the steps of:
    fusing a glass to form a glass tube, said glass containing (1) 67-71% of silicon dioxide, (2) 3-5% of aluminum oxide, (3) 12-14% of boric anhydride, (4) 8-10% of sodium oxide, (5) 3-6% of barium oxide, or calcium oxide, or a mixture of both, and (6) from 1 to under 2% of lithium oxide;
    cutting said glass tube across its longitudinal axis to obtain a glass bead having a second opening therethrough;
    placing said glass bead in said first opening;
    inserting a metal conductor through said second opening;
    heating the resultant assembly above the melting point of said glass bead; and
    cooling the heated assembly.

2. A liquid electrolytic capacitor having a hermetic glass-to-metal seal formed in accordance with claim 1.

3. A method according to claim 1, wherein said glass consists of (1) 67-71% of silicon dioxide, (2) 3-5% of aluminum oxide, (3) 12-14% of boric anhydride, (4) 8-10% of sodium oxide, (5) 3-6% of barium oxide, or calcium oxide, or a mixture of both, (6) from 1 to under 2% of lithium oxide, and, optionally, (7) a color-producing amount of cobaltous oxide or nickel monoxide.

4. A method according to claim 1, wherein said glass consists of (1) 67-71% of silicon dioxide, (2) 3-5% of aluminum oxide, (3) 12-14% of boric anhydride, (4) 8-10% of sodium oxide, (5) 3-6% of barium oxide, or calcium oxide, or a mixture of both, (6) from 1 to under 2% of lithium oxide, (7) 0.2-0.4% of calcium fluoride, and, optionally, (8) a color-producing amount of cobaltous oxide or nickel monoxide.

* * * * *